US 8,295,965 B2

United States Patent
Wu et al.

(10) Patent No.: US 8,295,965 B2
(45) Date of Patent: Oct. 23, 2012

(54) SEMICONDUCTOR PROCESSING DISPATCH CONTROL

(75) Inventors: Sunny Wu, Zhudong Town (TW); Yen-Di Tsen, Chung-Ho (TW); Chun-Hsien Lin, Hsin-Chu (TW); Keung Hui, Hsin-Chu (TW); Jo Fei Wang, Hsin-Chu (TW); Jong-I Mou, Hsinpu Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 276 days.

(21) Appl. No.: 12/839,014

(22) Filed: Jul. 19, 2010

(65) Prior Publication Data

US 2012/0016509 A1 Jan. 19, 2012

(51) Int. Cl.
*G06F 19/00* (2011.01)
*G01R 31/26* (2006.01)

(52) U.S. Cl. ............ 700/102; 700/121; 438/16; 438/17

(58) Field of Classification Search .................. 700/102, 700/121; 438/16, 17
See application file for complete search history.

(56) References Cited

U.S. PATENT DOCUMENTS

| 5,841,677 | A | * | 11/1998 | Yang et al. | 702/176 |
| 6,148,239 | A | * | 11/2000 | Funk et al. | 700/1 |
| 6,470,231 | B1 | * | 10/2002 | Yang et al. | 700/121 |
| 8,108,060 | B2 | * | 1/2012 | Tsen et al. | 700/108 |
| 2006/0129257 | A1 | * | 6/2006 | Chen et al. | 700/96 |
| 2008/0275676 | A1 | * | 11/2008 | Lin et al. | 703/2 |
| 2009/0035883 | A1 | * | 2/2009 | Wang et al. | 438/17 |
| 2009/0138114 | A1 | * | 5/2009 | Burda et al. | 700/101 |
| 2011/0060441 | A1 | * | 3/2011 | Ko et al. | 700/101 |
| 2011/0238197 | A1 | * | 9/2011 | Hsu et al. | 700/104 |

OTHER PUBLICATIONS

Stage-Based Process Analysis and Quality Prediction for Batch Processes, Ningyun Lu and Furong Gao Ind. Eng. Chem. Res. 2005,44, 3547-3555.*
Evaluating the Impact of Process Changes on Cluster Tool Performance, Jeffrey W. Herrmann, Niranjan Chandrasekaran, Brian F. Conaghan, Manh-Quan Nguyen, Gary W. Rubloff. IEEE Transactions on Semiconductor Manufacturing vol. 13,No. 2, May 2000.*

* cited by examiner

*Primary Examiner* — Mohammad Ali
*Assistant Examiner* — Sivalingam Sivanesan
(74) *Attorney, Agent, or Firm* — Slater & Matsil, L.L.P.

(57) ABSTRACT

An embodiment is a method for semiconductor processing control. The method comprises identifying a key process stage from a plurality of process stages based on a parameter of processed wafers, forecasting a trend for a wafer processed by the key process stage and some of the plurality of process stages based on the parameter, and dispatching the wafer to one of a first plurality of tools in a tuning process stage. The one of the first plurality of tools is determined based on the trend.

7 Claims, 8 Drawing Sheets

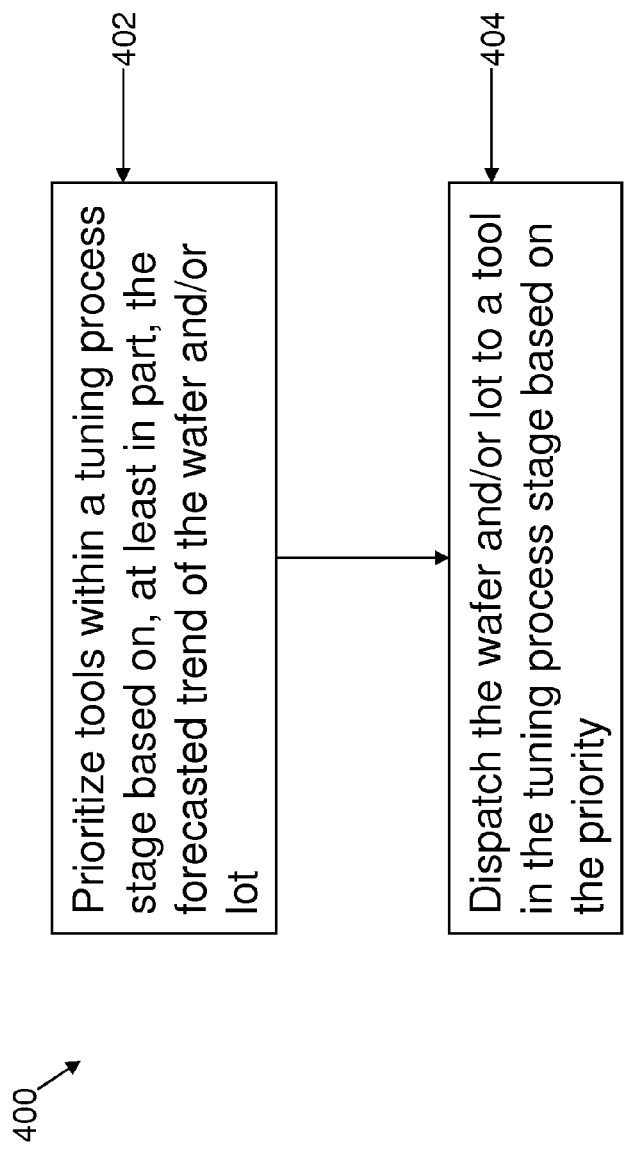

SEMICONDUCTOR PROCESSING DISPATCH CONTROL

TECHNICAL FIELD

The present disclosure relates generally to a system and method for semiconductor processing control and, more particularly, to a system and method for semiconductor processing dispatch control.

BACKGROUND

Generally, semiconductor wafers go through many processing steps before a completed die is formed. Some of these processing steps may include lithography, etching, doping, and depositing different materials. The quality of the completed die may depend largely on the accuracy and precision of the processing between different processing steps. For example, misalignment of a gate structure, imprecise doping concentrations, or dielectric layers that are too thick or thin may cause an undesirable amount of leakage current in a transistor or delay in the operation of the circuit.

Further complicating this problem may be a semiconductor manufacturer's desire to maximize the number of dies produced by the processing steps. In an attempt to maximize productivity, a manufacturer may provide many tools for each processing step. However, each tool may have a behavior different from other tools within the particular processing step. Accordingly, coordinating processing between different tools in different steps may be difficult.

One typical method for coordinating processing includes dispatching lots from tools to specified respective tools in a subsequent stage to compensate for previous processing. This method may consider only the in-line performance of each tool rather than the final quality of the completed product. Further, this method may also suffer from productivity drawbacks because lots from a first tool in a stage are automatically dispatched to a second tool in a subsequent stage without regard for the availability of the second tool.

Another typical method attempts to control tool behavior and does not have any set dispatching rules. One example is an Automatic Process Control (APC) that uses in-line measurements after processing a lot to control the tool that previously processed the lot and to control the tool that will immediately subsequently process the lot. This method may consider only productivity, such as minimizing tool idle time, and may ignore the mismatch impact between tools. Thus, the quality of a finished die may be adversely impacted.

SUMMARY

An embodiment is a method for semiconductor processing control. The method comprises identifying a key process stage from a plurality of process stages based on a parameter of processed wafers, forecasting a trend for a wafer processed by the key process stage and some of the plurality of process stages based on the parameter, and dispatching the wafer to one of a first plurality of tools in a tuning process stage. The one of the first plurality of tools is determined based on the trend.

Another embodiment is a computer program product for providing semiconductor processing control, and the computer program product has a medium with a computer program embodied thereon. The computer program comprises computer program code for providing a first data set for first measured results for a first parameter of processed wafers and a second data set for second measured results for a second parameter of the processed wafers. The first data set comprises first subsets, and the second data set comprises second subsets. Each first subset and each second subset corresponds to one tool in a processing line, and the processing line comprises multiple tools and multiple stages.

The computer program further comprises computer program code for determining a first residual model and a second residual model for each first subset and each second subset, respectively, and computer program code for determining a first residual vector and a second residual vector for each first subset and each second subset, respectively. A first residual vector entry is based on the first residual model and one of the first measured results of the respective first subset, and a second residual vector entry is based on the second residual model and one of the second measured results of the respective second subset.

The computer program further comprises computer program code for determining a first residual average and a first residual standard deviation of the first residual vector for each first subset, and a second residual average and a second residual standard deviation of the second residual vector for each second subset, such that each of the multiple tools has a corresponding first residual average, first residual standard deviation, second residual average, and second residual standard deviation. The computer program further comprises computer program code for, for each of the multiple stages, determining an overall index based on the first residual average, the first residual standard deviation, the second residual average, and the second residual standard deviation for each of the multiple tools in the respective stage.

The computer program further comprises computer program code for identifying at least one of the multiple stages as a key process stage when the at least one of the multiple stages has a corresponding overall index greater than a threshold, and comprises computer program code for forecasting a trend of a wafer based on routing of the wafer through some of the multiple stages through the key process stage. The computer program further comprises computer program code for dispatching the wafer to one of the multiple tools in at least one stage of the multiple stages subsequent to the key process stage in the processing line based on the trend.

A yet further embodiment is a system for semiconductor processing. The system comprises a processing line comprising a key process stage and a tuning process stage, a tool effect module operable to determine tool effects on an electrical parameter for tools in the key process stage and for tools in the tuning process stage, a trend forecast module operable to determine a trend of the electrical parameter of a wafer that has been processed through the key process stage, and a dispatch control module operable to determine a tuning tool in the tuning process stage that optimally compensates for the trend of the electrical parameter of the wafer and to dispatch the wafer to the tuning tool. The key process stage most affects the electrical parameter of a finished product, and the tuning process stage is subsequent the key processing stage in the processing line.

BRIEF DESCRIPTION OF THE DRAWINGS

For a more complete understanding of the present embodiments, and the advantages thereof, reference is now made to the following descriptions taken in conjunction with the accompanying drawings, in which:

FIG. 6 is a method for dispatching the wafer and/or lot for a tuning process;

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Figure 1:
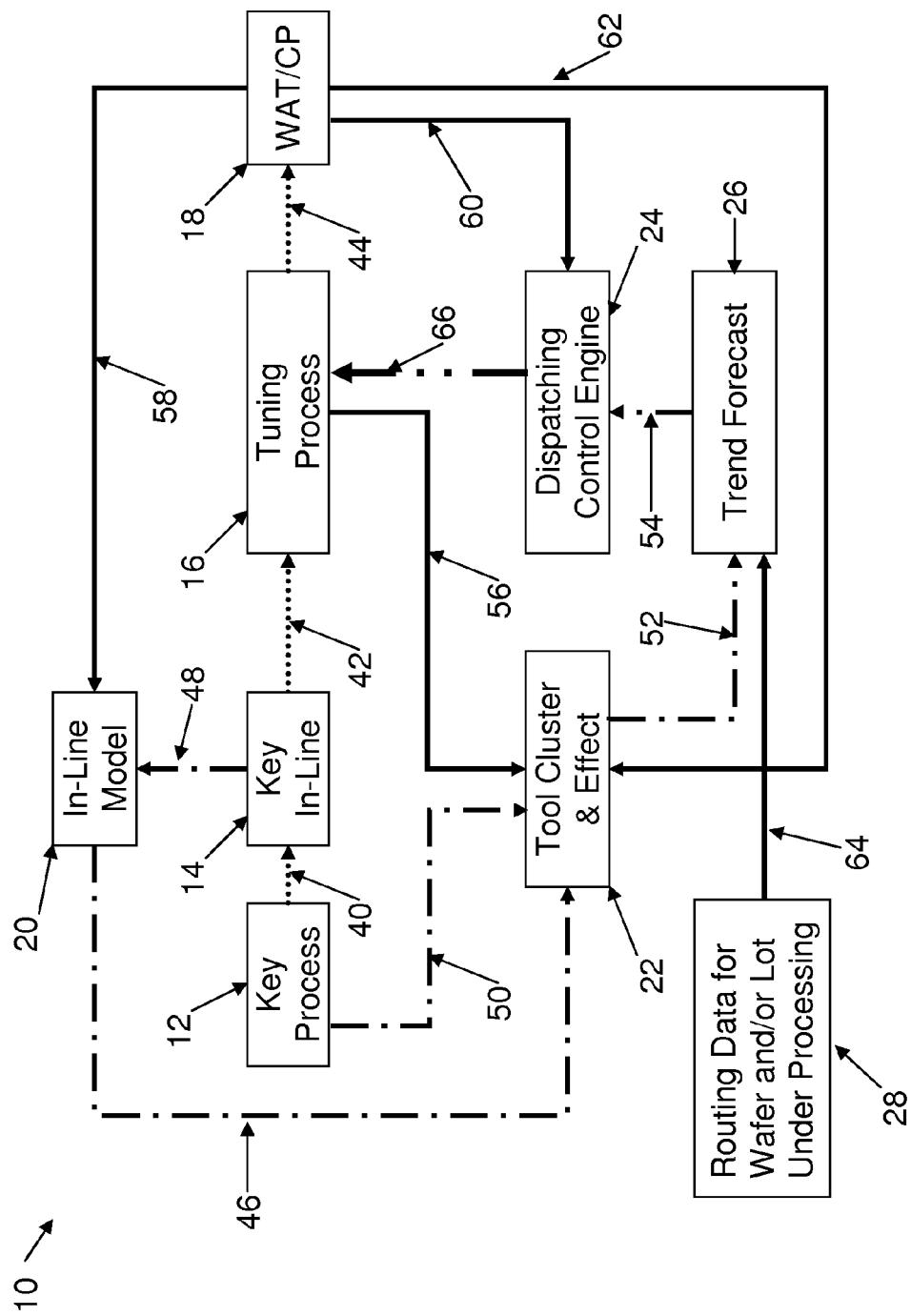
FIG. 1 is a system for semiconductor processing and for performing a method of semiconductor processing control.
Figure 2:
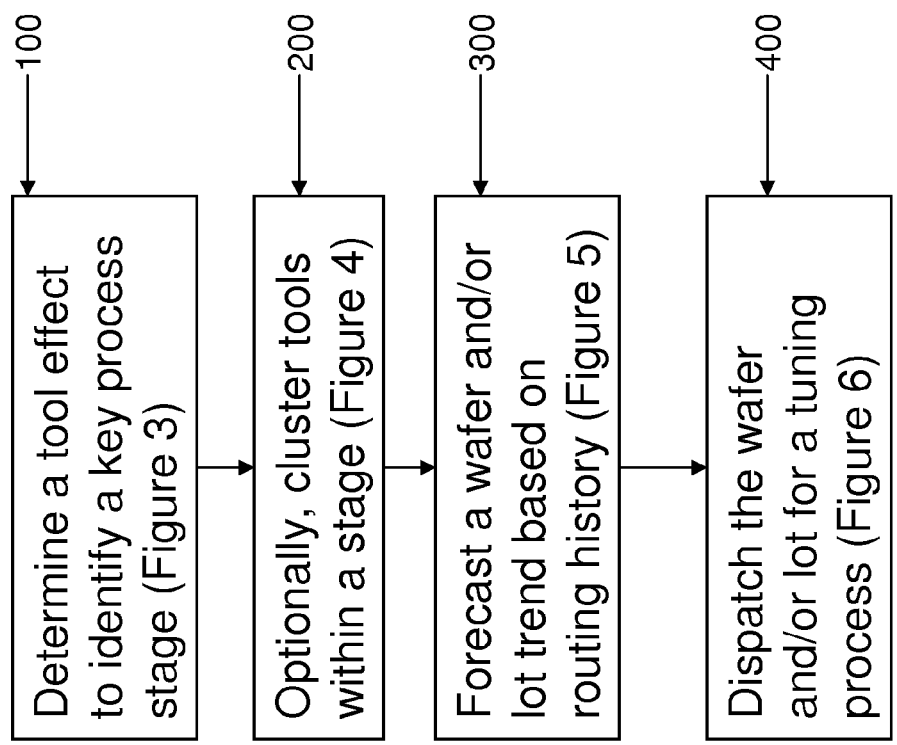
FIG. 2 is a method of semiconductor processing control.

Contemplated embodiments include a system for semiconductor processing, such as depicted in FIG. 1, and a method of semiconductor processing control, such as shown in FIG. 2. The system may be capable of performing the method of semiconductor processing control. Generally, the method may comprise, as shown in FIG. 2, determining a tool effect to identify a key process stage (Step 100), optionally, clustering tools within a stage (Step 200), forecasting a wafer and/or lot trend based on routing history (Step 300), and dispatching the wafer and/or lot for a tuning process (Step 400). Details of this method and the system for implementing this method are described below, wherein Step 100 is discussed with reference to FIG. 3, Step 200 is discussed with reference to FIG. 4, Step 300 is discussed with reference to FIG. 5, and Step 400 is discussed with reference to FIG. 6. However, a person having ordinary skill in the art will understand various modifications of these embodiments which are contemplated to be within the scope of other embodiments.

FIG. 1 illustrates a system 10 for semiconductor processing and for performing a method of semiconductor processing control according to an embodiment. The system 10 comprises a key process stage 12, a key in-line measurement device 14, a tuning process stage 16, and a wafer acceptance testing (WAT) and circuit performance testing (CP) device 18. Process flows 40, 42, and 44 depict the routing of a wafer and/or lot between the key process stage 12, key in-line measurement device 14, tuning process stage 16, and WAT/CP device 18 during processing in the system 10.

The system 10 further comprises an in-line model module 20, a tool cluster and effect (TCE) determination module 22, a dispatching control engine module 24, a trend forecasting module 26, and a routing data for wafer and/or lot under processing module 28. Control flows 46, 48, 50, 52, and 54 depict various data and control signals that are passed between various modules and devices for clustering, forecasting, and dispatching, for example. Data flows 56, 58, 60, 62, and 64 indicate the flow of data between different modules and devices for modeling and different determinations, for example. Dispatching control flow 66 depicts the flow of data for dispatching a wafer and/or lot for the tuning process stage 16. The data and control signals that are passed along the various flows will be explained in more detail in conjunction with other aspects of embodiments.

Figure 3:
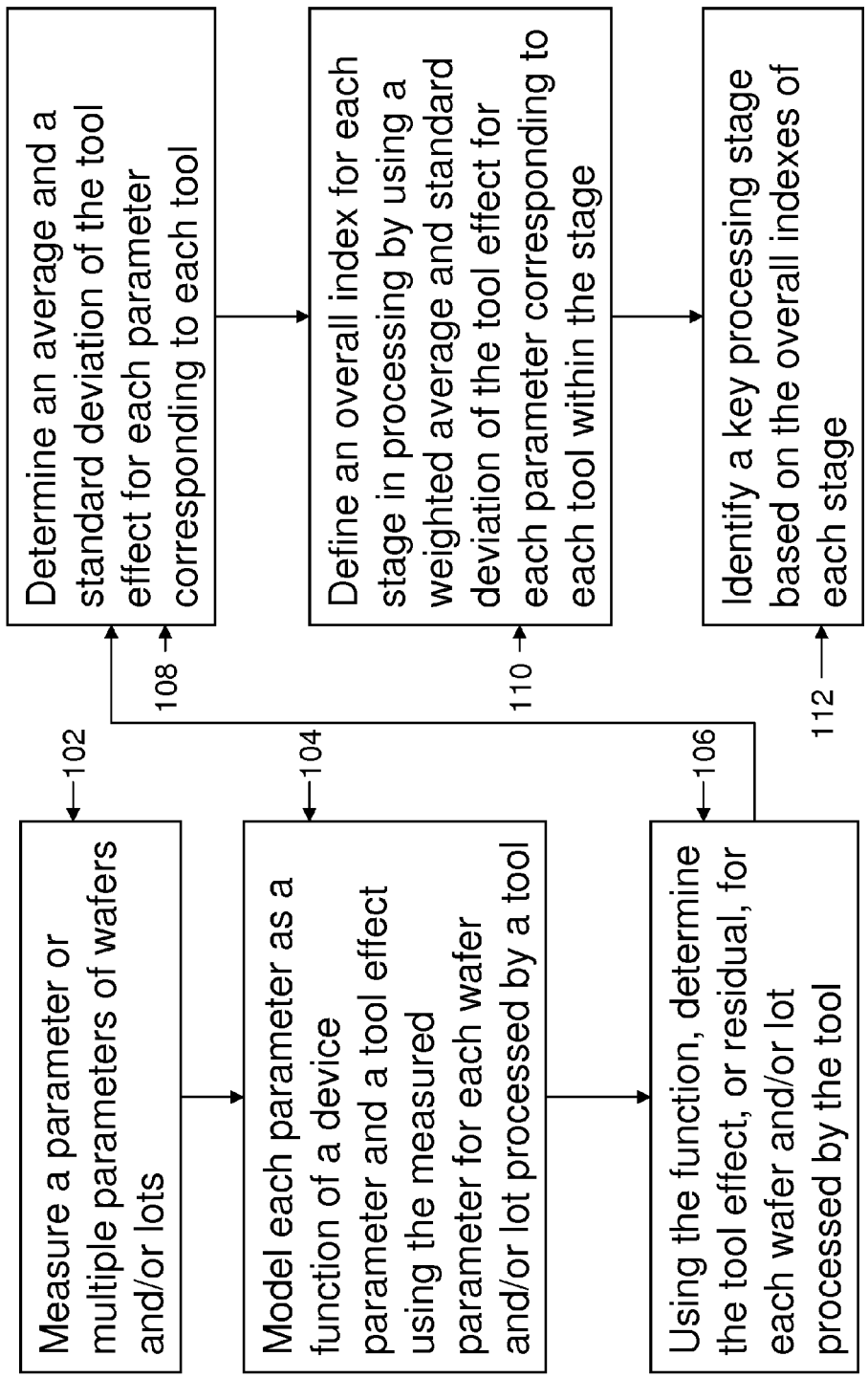
FIG. 3 is an exemplary method for determining a tool effect to identify a key process stage.

FIG. 3 is an exemplary method for determining a tool effect to identify the key process stage, as in Step 100 illustrated in FIG. 2. Details of the methods of FIGS. 3 through 6 will be discussed with reference to the system 10 of FIG. 1. Step 102 of FIG. 3 includes measuring a parameter or multiple parameters of wafers and/or lots. This measuring may be performed by the WAT/CP device 18. Exemplary parameters include leakage current of a device (IDDQ) and the delay of a device (P-delay), which will be used in later descriptions as examples for different embodiments. Various numbers of parameters and different parameters may be used in other embodiments.

Step 104 includes modeling each parameter as a function of a device parameter and a tool effect by using the measured parameter for each wafer and/or lot processed by a tool. For clarity, it should be noted that, even though not specifically depicted in FIG. 1, a manufacturing process may include numerous different stages and each stage may include multiple tools. Step 104 may be performed individually for each tool within the manufacturing process. With reference to FIG. 1, the WAT/CP device 18 may provide the measured parameter(s) to the in-line model module 20 by data flow 58. The in-line model module 20 may then create a model for each parameter, as described in step 104. For example, for a tool-1 in stage-2, the in-line model module 20 may collect a plurality of the measured values of IDDQ for wafers and/or lots processed by tool-1 in stage-2. Then, the in-line model module 20 may create a model for IDDQ using linear regression. The linear regression may define IDDQ as a function of a first coefficient times a PMOS saturation current, plus a second coefficient times a NMOS saturation current, plus the tool effect offset, i.e. $IDDQ = A_1 I_{D,satPMOS} + A_2 I_{D,satNMOS} + C$.

Step 106 includes using the function defined in step 104 to determine the tool effect, or residual, for each wafer and/or lot processed by the tool. The in-line model module 20 may determine the residual according to step 106. Continuing with the preceding example, the linear regression model may be manipulated to solve for the residual C, i.e.

$$C = IDDQ - A_1 I_{D,satPMOS} - A_2 I_{D,satNMOS}.$$

Step 108 includes determining an average and a standard deviation of the tool effect for each parameter corresponding to each tool. The in-line model module 20 may provide the residual to the TCE determination module 22 by control flow 46. The WAT/CP device 18 may provide the parameter measurements to the TCE determination module 22 by data flow 62. The TCE determination module 22 may use the residual and the measured parameter for each wafer and/or lot processed by the tool to determine a calculated tool effect corresponding to the parameter. The TCE determination module 22 may create a vector containing calculated tool effect entries, where each calculated tool effect entry corresponds to a measured wafer and/or lot. Further continuing the preceding example, individual entries for the calculated tool-1 effect vector for IDDQ may be determined using the residual C with the modeled coefficients $A_1$ and $A_2$ and the measured IDDQ, $I_{D,satPMOS}$, and $I_{D,satNMOS}$ for an individual wafer and/or lot processed by tool-1. Similarly, a tool-1 effect vector for P-delay may be determined.

Once the tool effect vector corresponding to the parameter is compiled, an average $\mu$ and a standard deviation $\sigma$ of the tool effect for each parameter may be determined. Although many different means of calculating the average $\mu$ and standard deviation $\sigma$ are available, one technique TCE determination module 22 may use is a standard deviational ellipse method when multiple parameters are used to determine the tool effect. The standard deviation ellipse may transform the tool effect vectors for multiple parameters into a spatial ellipse encompassing at least, for example, ninety-five percent of the entries, where each parameter corresponds to an axis of the ellipse. Based on the ellipse, the average μ and standard deviation σ of the tool effect for each parameter may be calculated. Persons having ordinary skill in the art will readily understand this computation, and as such, explicit discussion of the computation herein is omitted for brevity. Continuing the above example, first entries in the tool-1 effect vector for IDDQ and the tool-1 effect vector for P-delay should correspond to measurements of a first wafer and/or lot, second entries of the vectors should correspond to measurements of a second wafer and/or lot, and so on. The P-delay parameter may serve as an x-axis and the IDDQ parameter may serve as the y-axis for a distribution of entries. The distribution may then be transformed into an ellipse, and an average $\mu_I$ and standard deviation $\sigma_I$ of the tool-1 effect for IDDQ and an average $\mu_P$ and standard deviation $\sigma_P$ of the tool-1 effect for P-delay may be determined from the ellipse.

It should further be noted that steps 104, 106, and 108 may be carried out individually for each tool in each stage. For example, in the above example, stage-2 may comprise a tool-1, a tool-2, and a tool-3. For each tool, an average $\mu_I$ and standard deviation $\sigma_I$ of the tool effect for IDDQ and an average $\mu_P$ and standard deviation $\sigma_P$ of the tool effect for P-delay may be determined. The average and standard deviation of the tool-1 effect for IDDQ may be noted as $\mu_{I,1}$ and $\sigma_{I,1}$, respectively, and the tool-2 effect for IDDQ may be noted as $\mu_{I,2}$ and $\sigma_{I,2}$. A generic notation is that for tool k, the average and standard deviation of the tool effect for IDDQ and an average and standard deviation of the tool effect for P-delay may be noted as $\mu_{I,k}$, $\sigma_{I,k}$, $\mu_{P,k}$ and $\sigma_{P,k}$, respectively.

Step 110 includes defining an overall index for each stage in processing by using a weighted average and weighted standard deviation of the tool effect for each parameter corresponding to each tool within the stage. The TCE determination module 22 may determine the overall index by calculating the weighted average of the pair-wise distances between the weighted averages of the parameter or multiple parameters plus the weighted average of the pair-wise distances of the weighted variances of the parameter(s) for each stage.

Step 110 may be illustrated by continuing the above example. Define vectors $\mu_X$ and $\sigma_X$ for N tools in stage X as $$\mu_x = \begin{bmatrix} \mu_k^X \\ \mu_{k+1}^X \\ \vdots \\ \mu_N^X \end{bmatrix} \text{ and } \sigma_x = \begin{bmatrix} \sigma_k^X \\ \sigma_{k+1}^X \\ \vdots \\ \sigma_N^X \end{bmatrix}$$

where, for tool k in stage X, $\mu_k^X = (\mu_{I,k}^X, \mu_{P,k}^X)$ and $\sigma_k^X = (\sigma_{I,k}^X, \sigma_{P,k}^X)$. Further, define weighted vectors $\overline{\mu_X}$ and $\overline{\sigma_X}$ for N tools in stage X as $$\overline{\mu_x} = \begin{bmatrix} \overline{\mu_k^X} \\ \overline{\mu_{k+1}^X} \\ \vdots \\ \overline{\mu_N^X} \end{bmatrix} \text{ and } \overline{\sigma_x} = \begin{bmatrix} \overline{\sigma_k^X} \\ \overline{\sigma_k^X} \\ \vdots \\ \overline{\sigma_N^X} \end{bmatrix}$$

where, for tool k, $\overline{\mu_k^X} = (w_1 \mu_{I,k}^X, w_2 \mu_{P,k}^X)$ and $\overline{\sigma_k^X} = (w_3 \sigma_{I,k}^X, w_4 \sigma_{P,k}^X)$. It should be noted for clarity that superscript X is a stage identifier and not an exponent. The overall index $OI_X$ for stage X may be defined as the weighted average of the pair-wise distances between the weighted averages $\overline{\mu_X}$ plus the weighted average of the pair-wise distances between the weighted standard deviations $\overline{\sigma_X}$. Mathematically, this is represented by equation (1) below.

$$OI_X(\overline{\mu_X}, \overline{\sigma_X} | i, j > i) = w_\mu E[D(\overline{\mu_i^X}, \overline{\mu_j^X})] + w_\sigma E[D(\overline{\sigma_i^X}, \overline{\sigma_j^X})] \qquad \text{Eq. (1)}$$

A long-hand example for determining the overall index $OI_X$ of a stage-2, i.e. X=2, comprising tool-1, tool-2, and tool-3, i.e. N=3, is show below in equation (2), according to the definition in equation (1).

$$OI_2 = \frac{w_\mu}{3} \times \left[ \sqrt{(w_1 \mu_{I,1}^2 - w_1 \mu_{I,2}^2)^2 + (w_2 \mu_{P,1}^2 - w_2 \mu_{P,2}^2)^2} + \right. \qquad \text{Eq. (2)}$$
$$\sqrt{(w_1 \mu_{I,1}^2 - w_1 \mu_{I,3}^2)^2 + (w_2 \mu_{P,1}^2 - w_2 \mu_{P,3}^2)^2} +$$
$$\left. \sqrt{(w_1 \mu_{I,2}^2 - w_1 \mu_{I,3}^2)^2 + (w_2 \mu_{P,2}^2 - w_2 \mu_{P,3}^2)^2} \right] +$$
$$\frac{w_\sigma}{3} \times \left[ \sqrt{(w_3 \sigma_{I,1}^2 - w_3 \sigma_{I,2}^2)^2 + (w_4 \sigma_{P,1}^2 - w_4 \sigma_{P,2}^2)^2} + \right.$$
$$\sqrt{(w_3 \sigma_{I,1}^2 - w_3 \sigma_{I,3}^2)^2 + (w_4 \sigma_{P,1}^2 - w_4 \sigma_{P,3}^2)^2} +$$
$$\left. \sqrt{(w_3 \sigma_{I,2}^2 - w_3 \sigma_{I,3}^2)^2 + (w_4 \sigma_{P,2}^2 - w_4 \sigma_{P,3}^2)^2} \right]$$

Weights, such as weights $w_\mu$, $w_\sigma$, $w_1$, $w_2$, $w_3$, and $w_4$, may be determined through an iterative trial and error process. The weights may be valued so as to place a higher priority or weight on the parameter(s) that most affect the quality of a finished product. For example, if the parameter that causes the most defective dies is the average of IDDQ, then weight $w_1$ may be larger than the other weights. Further as an example, if the deviation of the P-delay is the greatest factor, then weight $w_4$ may be larger than the other weights. Another constraint on the weights may include a soft constraint that maintains maximum correlation weighting with respect to a desired final target, such as yield or WAT/CP.

Step 112 includes identifying a key processing stage based on the overall indexes of each stage. The TCE determination module 22 may compare the overall indexes of the stages to determine if any overall index is above a defined threshold. For an overall index above the threshold, the stage corresponding to the overall index may be identified as a key process stage 12. Also, the TCE determination module 22 may identify a stage subsequent to the identified key process stage 12 in the manufacturing flow as a tuning process stage 16. For example, assume that a manufacturing process comprises sequential stage-1, stage-2, and stage-3, and that the overall index for stage-2 $OI_2$ is over the threshold. Stage-2 may be identified as a key process stage. Further, subsequent stage-3 may be identified as a tuning process stage.

Figure 4:
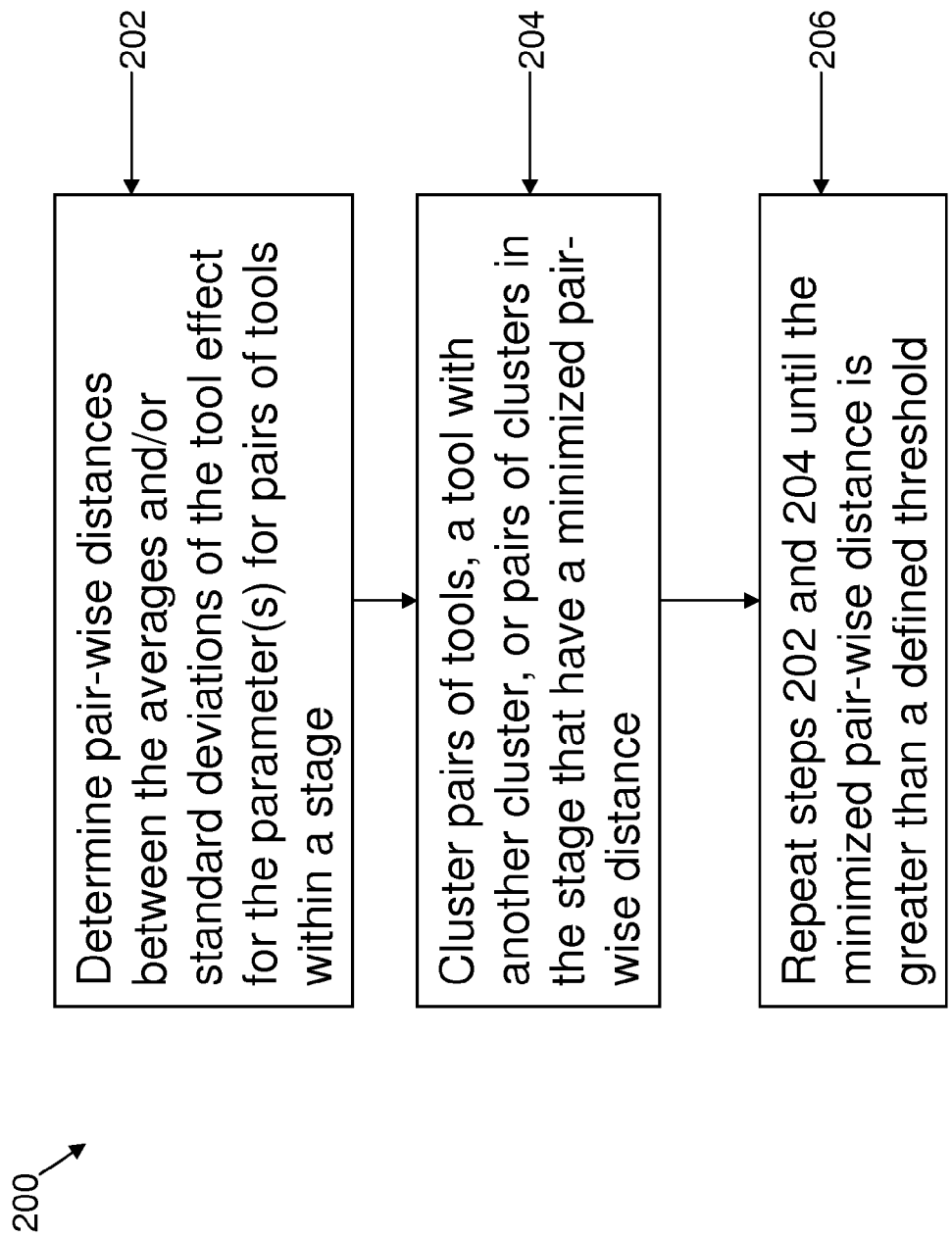
FIG. 4 is an exemplary method for clustering tools within a stage.

FIG. 4 is an exemplary method for clustering tools within a stage, as in Step 200 illustrated in FIG. 2. Step 202 includes determining pair-wise distances between the averages and/or standard deviations of the tool effect for the parameter(s) for pairs of tools within a stage. Step 204 includes clustering pairs of tools, a tool with another cluster, or pairs of clusters within the stage that have a minimized pair-wise distances. Step 206 includes repeating steps 202 and 204 until the minimized pair-wise distance is greater than a defined threshold. The TCE determination module 22 may perform steps 202, 204, and 206 for easier handling of the number of tools. The clustering may be said to be agglomerative and may be visually represented by a dendrogram. Persons having ordinary skill in the art will readily understand that there are many versions of agglomerative clustering, and each version is contemplated as being within the scope of different embodiments. Further, other clustering methods are considered within the scope of embodiments, such as K-centering clustering.

Figure 5:
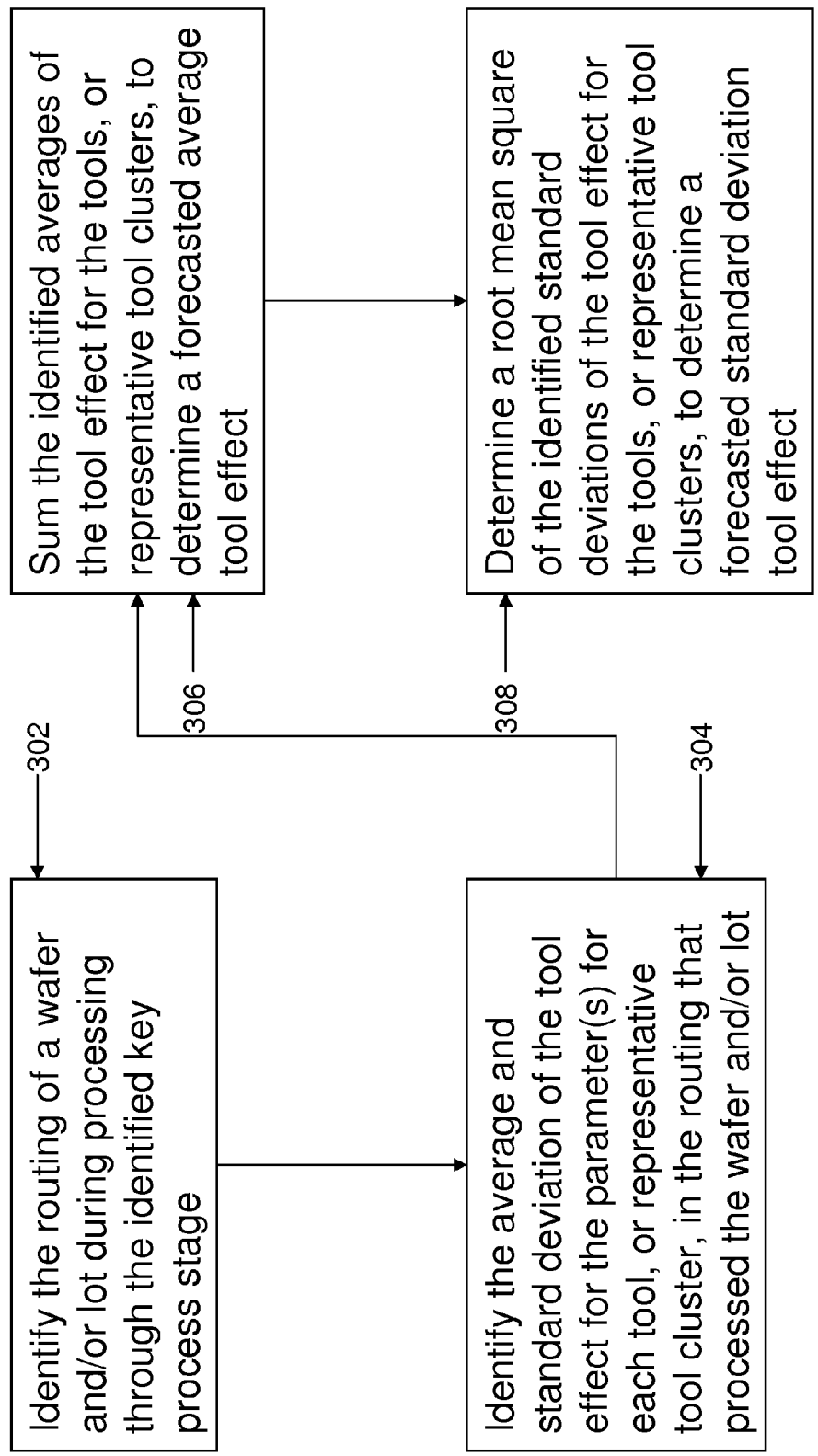
FIG. 5 is an exemplary method for forecasting a wafer and/or lot trend based on routing history.

FIG. 5 is an exemplary method for forecasting a wafer and/or lot trend based on routing history, as in Step 300 illustrated in FIG. 2. Step 302 includes identifying the routing of a wafer and/or lot during processing through the identified key process stage. The routing data for wafer and/or lot under processing module 28 may provide the routing data that identifies the routing of the wafer and/or lot to the trend forecasting module 26 by data flow 64. The wafer and/or lot may be dispatched through various different routes through the identified key process stage 12. For example, in a manufacturing process that comprises three stages, stage-1, stage-2, and stage-3, with each stage comprising three tools, tool-1, tool-2, and tool-3, if stage-2 is identified as a key process stage 12, a wafer and/or lot may be dispatched through one of nine different routes through stage-2. If the wafer and/or lot is dispatched to stage-1 tool-2 and to stage-2 tool-3, this routing information may be sent to the trend forecasting module 26.

Step 304 includes identifying the average and standard deviation of the tool effect for the parameter(s) for each tool, or representative tool cluster, in the routing that processed the wafer and/or lot. The TCE determination module 22 may receive data from the key process stage 12 via control flow 50 and may provide the average and standard deviation of the tool effect for the parameter(s) being used in the process to the trend forecasting module 26 by control flow 52. The trend forecasting module 26 may identify the averages and standard deviations for the tools or representative tool clusters that processed the wafer and/or lot during the different stages by use of the routing data provided by the routing data for wafer and/or lot under processing module 28. For example, assume the three stage process above with stage two being a key process stage 12, and assume the parameters used are IDDQ and P-delay as discussed above. The TCE determination module 22 may provide the averages and standard deviations for IDDQ and P-delay for stage-1 tool-1, stage-1 tool-2, stage-1 tool-3, stage-2 tool-1, stage-2 tool-2, and stage-2 tool-3, i.e. vectors $\mu_1$, $\sigma_1$, $\mu_2$, and $\sigma_2$. From vectors $\mu_1$, $\sigma_1$, $\mu_2$, and $\sigma_2$, the trend forecasting module 26 may identify the averages and standard deviations of IDDQ and P-delay for stage-1 tool-2 from vectors $\mu_1$ and $\sigma_1$, i.e. $\mu_2{}^1 = (\mu_{I,2}{}^1, \mu_{P,2}{}^1)$ and $\sigma_2{}^1 = (\sigma_{I,2}{}^1, \sigma_{P,2}{}^1)$ based on the routing data, and may identify the averages and standard deviations of IDDQ and P-delay for stage-2 tool-3 from vectors $\mu_2$ and $\sigma_2$, i.e.

$$\mu_3{}^2(\mu_{I,3}{}^2, \mu_{P,3}{}^2) \text{ and } \sigma_3{}^2 = (\sigma_{I,3}{}^2, \sigma_{P,3}{}^2).$$

Step 306 includes summing the identified averages of the tool effect for the tools, or representative tool clusters, to determine a forecasted average tool effect. The trend forecasting module 26 may perform this step. Continuing the above example, the trend forecasting module 26 may sum the averages of IDDQ for the tools that processed the wafer and/or lot in the two stages and may sum the averages of P-delay for the tools that processed the wafer and/or lot in the two stages. In this example, the general equations may be as shown in equations (3) and (4) below, where M−1 is the stage number of the key process stage 12.

$$\hat{\mu}_I = \sum_{q=1}^{M-1} \mu_{I,k}^q \qquad \text{Eq. (3)}$$

$$\hat{\mu}_P = \sum_{q=1}^{M-1} \mu_{P,k}^q \qquad \text{Eq. (4)}$$

More specifically for the example, the forecasted average tool effect may be shown as below in equations (5) and (6).

$$\hat{\mu}_I = \sum_{q=1}^{2} \mu_{I,k}^q = \mu_{I,2}^1 + \mu_{I,3}^2 \qquad \text{Eq. (5)}$$

$$\hat{\mu}_P = \sum_{q=1}^{2} \mu_{P,k}^q = \mu_{P,2}^1 + \mu_{P,3}^2 \qquad \text{Eq. (6)}$$

Step 308 includes determining a root mean square (RMS) of the identified standard deviations of the tool effects for the tools, or representative tool clusters, to determine a forecasted standard deviation tool effect. The trend forecasting module 26 may perform this step. Continuing further with the above example, the trend forecasting module 26 may determine the RMS of the standard deviations of IDDQ for the tools that processed the wafer and/or lot in the two stages and may determine the RMS of the standard deviations of P-delay for the tools that processed the wafer and/or lot in the two stages. In this example, the general equations may be as shown in equations (7) and (8) below.

$$\hat{\sigma}_I = RMS(\sigma_{I,k}^q) \qquad \text{Eq. (7)}$$

$$\hat{\sigma}_P = RMS(\sigma_{P,k}^q) \qquad \text{Eq. (8)}$$

More specifically for the example, the forecasted standard devistion tool effect may be shown as below in equations (9) and (10).

$$\hat{\sigma}_I = RMS(\sigma_{I,k}^q) = \sqrt{\frac{(\sigma_{I,2}^1)^2 + (\sigma_{I,3}^2)^2}{2}} \qquad \text{Eq. (9)}$$

$$\hat{\sigma}_P = RMS(\sigma_{P,k}^q) = \sqrt{\frac{(\sigma_{P,2}^1)^2 + (\sigma_{P,3}^2)^2}{2}} \qquad \text{Eq. (10)}$$

FIG. 6 is a method for dispatching the wafer and/or lot for a tuning process, as in Step 400 illustrated in FIG. 2. Step 402 includes prioritizing tools within a tuning process stage based on, at least in part, the forecasted trend of the wafer and/or lot. The dispatching control engine module 24 may prioritize the tools within the tuning process stage 16 based on the forecasted average and standard deviation of the tool effects for the tools that processed the wafer and/or lot. The tuning process stage 16 may provide data to identify which tools are in the tuning process stage 16 to the TCE determination module 22 by data flow 56. The TCE determination module 22 may then forward the data to the trend forecasting module 26 along with the average and standard deviation of the tool effect for the parameter(s) corresponding to the tools in the tuning process stage 16 by control flow 52. The trend forecasting module 26 may then provide the data for which tools are in the tuning process stage 16, the averages and standard deviations of the tool effects corresponding to those tools, and the forecasted average and standard deviation of the tool effects to the dispatching control engine module 24 by control flow 54. The dispatching control engine module 24 may also receive target information from the WAT/CP device 18 by the data flow 60.

By having the forecasted trend and the tool effects for the various tools in the tuning process stage, the dispatching control engine module 24 may prioritize the tools within the tuning process stage 16 to obtain a desired output of the tuning process stage 16. By knowing the forecast trend, a tool in the tuning process stage 16 that most appropriately compensates for these amounts may be assigned a higher priority. With the above example, based on an optimization comparing the forecasted trend $\hat{\mu}_T$, $\hat{\mu}_P$, $\hat{\sigma}_T$, and $\hat{\sigma}_P$, to the averages and standard deviations of the tool effect of each tool in the tuning process stage 16, i.e. stage-3 $\mu_{T,k}^3$, $\sigma_{T,k}^3$, $\mu_{P,k}^3$, and $\sigma_{P,k}^3$, to attain a target, tools in the tuning process stage 16 may be prioritized for the wafer and/or lot. The optimization may consider a lot independently to best achieve the desired target for the lot. The optimization may further consider all lots that are being processed by the system simultaneously to balance achieving the desired target and availability of tools in the tuning process stage.

Figure 7A:
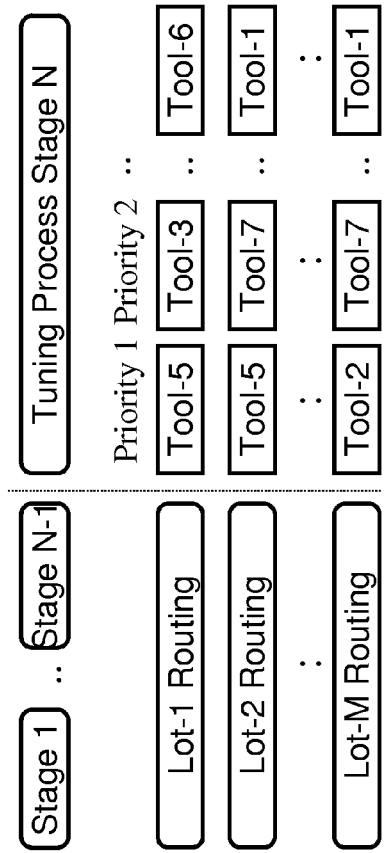
FIG. 7A is an example of results of a prioritization considering lots that are being processed independently and of routing in a tuning process.
Figure 7B:
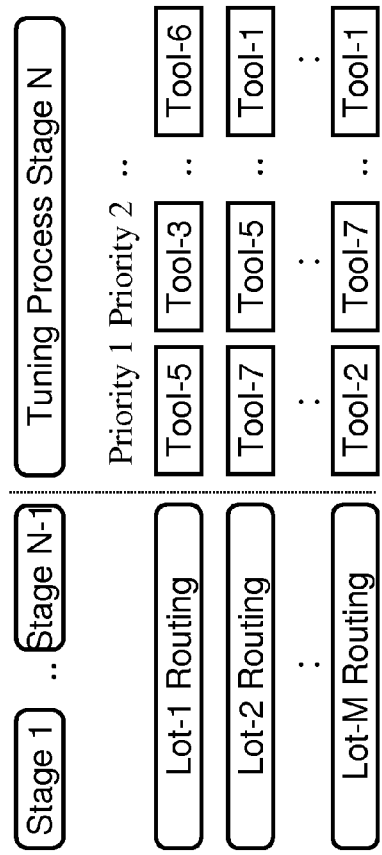
FIG. 7B is an example of results of a prioritization considering all lots that are being processed simultaneously and of routing in a tuning process.

With reference to FIGS. 7A and 7B, there are shown example results of a prioritization considering a lot that is being processed independently and of a prioritization considering all lots that are being processed simultaneously, respectively. In FIGS. 7A and 7B, there are shown various routings for Lot-1 through Lot-M between Stage-1 through Stage-(N−1), where Stage-(N−1) is a key process stage, such as key process stage 12. FIG. 7A shows the priority (Priority 1, Priority 2, etc.) assigned to the tools (Tool-1, Tool-2, etc.) in the tuning process stage N, such as the tuning process stage 16 in FIG. 1. Because each lot is considered independently in FIG. 7A, Tool-5 may be assigned the highest priority, Priority 1, for both Lot-1 and Lot-2 regardless of whether Tool-5 will be available or released when Lot-2 is available for processing. In FIG. 7B, Tool-5 is given a lower priority, Priority 2, compared to FIG. 7A, for Lot-2 because the prioritization considers all lots simultaneously and, thus, the availability of tools in Stage-N, the tuning process stage.

Referring back to FIG. 6, step 404 includes dispatching the wafer and/or lot to a tool in the tuning process stage based on the priority. The dispatching control engine module 24 may provide a dispatch control signal to the tuning process stage 16 by dispatching control flow 66 based on the priority assigned by the dispatching control engine module 24 to the tools in the tuning process stage 16. The dispatch control signal may direct to which tool the wafer and/or lot may be dispatched for processing. The tuning process stage 16 may therefore compensate the forecasted trend by having the wafer and/or lot processed by a tool that has a tool effect that compensates the forecasted trend. Referring to FIGS. 7A and 7B, each lot may be dispatched to the respective tool that has been assigned Priority 1 with regard to that lot. For example, in FIG. 7A, Lot-2 may be dispatched to Tool-5 in tuning process stage N, and in FIG. 7B, Lot-2 may be dispatched to Tool-7 in tuning process stage N.

Using an embodiment may allow a finished wafer to have a higher electrical performance quality than using previously known systems and methods. For example, the wafer may be manufactured nearer to a target because of the compensation control provided by an embodiment. Further, an embodiment may balance productivity by limiting downtime of tools or of lots and quality of the end product. Also, according to an embodiment, not only may the quality be increased, but a deviation of electrical performance between different wafers or lots may be decreased.

It should also be noted that the figures, particularly FIG. 1, illustrate a simplified system to clearly depict novel concepts of embodiments. A person having ordinary skill in the art will readily understand that such a system may comprise a multitude of stages. The system may similarly comprise multiple key process stages and multiple tuning process stages, although only one of each is depicted in FIG. 1. Further, the system may comprise other stages before, between, and/or after a key process stage and a tuning process stage. These other stages may be uncontrolled by an embodiment, but may be controlled by other acceptable methods, such as an Automatic Process Control (APC) system. For example, measurements from key in-line measurement device 14 may provide measurements to the in-line model module 20 by control flow 48 for use in an APC system.

Figure 8:
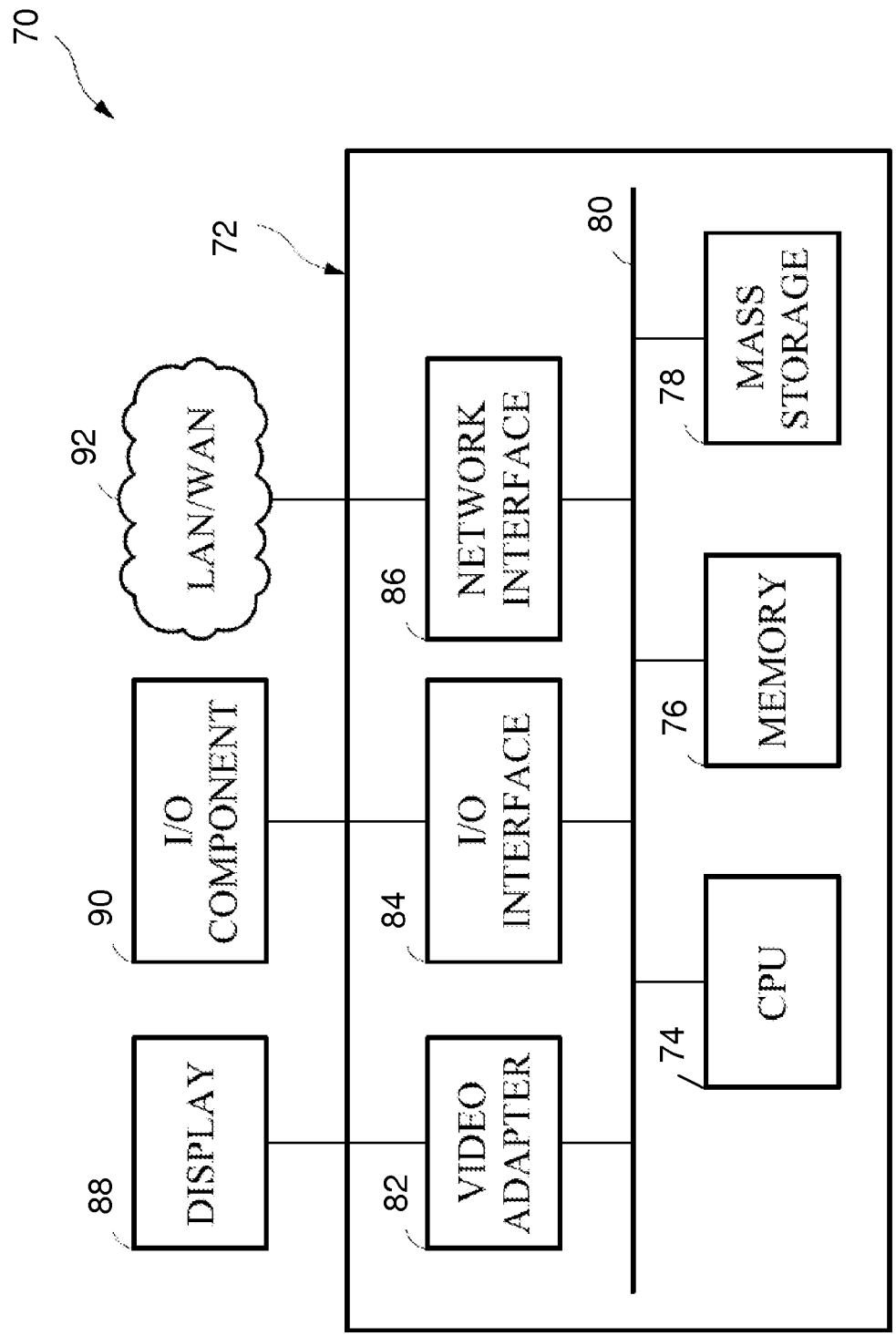
FIG. 8 is a block diagram of a processor based system.

Also, the different modules depicted in FIG. 1 may be implemented using computer program code in one or more general purpose computer or processor based system. Referring now to FIG. 8, a block diagram of a processor based system 70 is provided in accordance with an embodiment. The processor based system 70 is a general purpose computer platform and may be used to implement processes discussed herein. The processor based system 70 may comprise a processing unit 72, such as a desktop computer, a workstation, a laptop computer, or a dedicated unit customized for a particular application. The processor based system 70 may be equipped with a display 88 and one or more input/output devices 90, such as a mouse, a keyboard, or printer. The processing unit 72 may include a central processing unit (CPU) 74, memory 76, a mass storage device 78, a video adapter 82, and an I/O interface 84 connected to a bus 80.

The bus 80 may be one or more of any type of several bus architectures including a memory bus or memory controller, a peripheral bus, or video bus. The CPU 74 may comprise any type of electronic data processor, and the memory 76 may comprise any type of system memory, such as static random access memory (SRAM), dynamic random access memory (DRAM), or read-only memory (ROM).

The mass storage device 78 may comprise any type of storage device configured to store data, programs, and other information and to make the data, programs, and other information accessible via the bus 80. The mass storage device 78 may comprise, for example, one or more of a hard disk drive, a magnetic disk drive, or an optical disk drive.

The video adapter 82 and the I/O interface 84 provide interfaces to couple external input and output devices to the processing unit 72. As illustrated in FIG. 8, examples of input and output devices include the display 88 coupled to the video adapter 82 and the I/O device 90, such as a mouse, keyboard, printer, and the like, coupled to the I/O interface 84. Other devices may be coupled to the processing unit 72, and additional or fewer interface cards may be utilized. For example, a serial interface card (not shown) may be used to provide a serial interface for a printer. The processing unit 72 also may include a network interface 86 that may be a wired link to a local area network (LAN) or a wide area network (WAN) 92 and/or a wireless link.

It should be noted that the processor based system 70 may include other components. For example, the processor based system 70 may include power supplies, cables, a motherboard, removable storage media, cases, and the like. These other components, although not shown, are considered part of the processor based system 70.

Embodiments may be implemented on the processor based system 70, such as by program code executed by the CPU 74. A person having ordinary skill in the art will readily understand how methods according to embodiments, such as those described with respect to FIGS. 2 through 6 above, may be implemented by program code. Accordingly, explicit discussion herein is omitted.

Further, it should be noted that the modules in FIG. 1 may all be implemented on one processor based system 70, that each module may be implemented on a separate processor based system 70, or that a combination of modules may be implemented on various numbers of processor based systems 70. Communication between the different modules, such as data flow 64 and control flows 46, 52, and 54, may vary depending upon how the modules are implemented. If the modules are implemented on one processor based system 70, data may be saved in memory 76 or mass storage 78 between the execution of program code for different steps by the CPU 74. The data may then be provided by the CPU 74 accessing the memory 76 or mass storage 78 via bus 80 during the execution of a respective step. If modules are implemented on different processor based systems 70 or if data is to be provided from another storage system, such as a separate database, data can be provided between the systems 70 through I/O interface 84 or network interface 86. Similarly, data provided by the devices or stages may be input into one or more processor based system 70 by the I/O interface 84 or network interface 86. A person having ordinary skill in the art will readily understand other variations and modifications in implementing systems and methods that are contemplated within the scope of varying embodiments.

Although the present embodiments and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer program product for providing semiconductor processing control, the computer program product having a non-transitory medium with a computer program embodied thereon, the computer program comprising:

computer program code for providing a first data set for first measured results for a first parameter of processed wafers and a second data set for second measured results for a second parameter of the processed wafers, the first data set comprising first subsets, and the second data set comprising second subsets, each first subset and each second subset corresponding to one tool in a processing line, the processing line comprising multiple tools and multiple stages;

computer program code for determining a first residual model and a second residual model for each first subset and each second subset, respectively;

computer program code for determining a first residual vector and a second residual vector for each first subset and each second subset, respectively, a first residual vector entry being based on the first residual model and one of the first measured results of the respective first subset, and a second residual vector entry being based on the second residual model and one of the second measured results of the respective second subset;

computer program code for determining a first residual average and a first residual standard deviation of the first residual vector for each first subset, and a second residual average and a second residual standard deviation of the second residual vector for each second subset, such that each of the multiple tools has a corresponding first residual average, first residual standard deviation, second residual average, and second residual standard deviation;

computer program code for, for each of the multiple stages, determining an overall index based on the first residual average, the first residual standard deviation, the second residual average, and the second residual standard deviation for each of the multiple tools in the respective stage;

computer program code for identifying at least one of the multiple stages as a key process stage when the at least one of the multiple stages has a corresponding overall index greater than a threshold;

computer program code for forecasting a trend of a wafer based on routing of the wafer through some of the multiple stages through the key process stage; and computer program code for dispatching the wafer to one of the multiple tools in at least one stage of the multiple stages subsequent to the key process stage in the processing line based on the trend.

2. The computer program product of claim 1, wherein the computer program code for determining the first residual average, the first residual standard deviation, the second residual average, and the second residual standard deviation comprises:

computer program code for forming an ellipse of a distribution of the first residual vector and the second residual vector for each first subset and each second subset, respectively, wherein a first dimensional axis represents the first parameter, and a second dimensional axis represents the second parameter; and computer program code for determining the first residual average, the first residual standard deviation, the second residual average, and the second residual standard deviation based on the ellipse for each respective first subset and second subset.

3. The computer program product of claim 1, wherein the first parameter is a leakage current (IDDQ), and the second parameter is a circuit delay (P-delay).

4. The computer program product of claim 1, wherein the computer program code for determining the overall index includes using a weighted average of pair-wise distances between weighted average points plus a weighted average of pair-wise distances between weighted standard deviation points, wherein each average point comprises one first residual average and one second residual average for one tool of the multiple tools in the respective stage, and each standard deviation point comprises one first residual standard deviation and one second residual standard deviation for one tool of the multiple tools in the respective stage.

5. The computer program product of claim 1, wherein the computer program code for forecasting the trend of the wafer comprises:
- computer program code for identifying routed tools in the some of the multiple stages through the key process stage that processed the wafer;
- computer program code for identifying the first residual average, the first residual standard deviation, the second residual average, and the second residual standard deviation corresponding to the routed tools;
- computer program code for summing together the first residual average corresponding to each of the routed tools to obtain a first trend average;
- computer program code for summing together the second residual average corresponding to each of the routed tools to obtain a second trend average;
- computer program code for determining a root mean square (RMS) of the first residual standard deviation corresponding to each of the routed tools to obtain a first trend standard deviation; and
- computer program code for determining a RMS of the second residual standard deviation corresponding to each of the routed tools to obtain a second trend standard deviation.

6. The computer program product of claim 5, wherein the computer program code for dispatching the wafer comprises:
- computer program code for assigning a priority to each of the multiple tools in the one stage of the multiple stages subsequent to the key process stage based on an optimization based on at least one of the first residual average, the first residual standard deviation, the second residual average, and the second residual standard deviation of the corresponding one of the multiple tools in the one stage and at least one of the first trend average, the first trend standard deviation, the second trend average, and the second standard deviation; and
- computer program code for dispatching the wafer to the one of the multiple tools in the one stage, wherein the one of the multiple tools has a high assigned priority.

7. The computer program product of claim 1, wherein the computer program further comprises:
- computer program code for determining a pair-wise distance between average points and/or between standard deviation points, wherein each average point comprises one first residual average and one second residual average for one tool of the multiple tools in the respective stage, and each standard deviation point comprises one first residual standard deviation and one second residual standard deviation for one tool of the multiple tools in a respective stage; and
- computer program code for clustering at least two tools in the respective stage that has a minimized pair-wise distance.

* * * * *